April 29, 1930.   M. A. SCHWARTZ   1,756,800
DISTORTION MOTOR
Filed Feb. 23, 1928
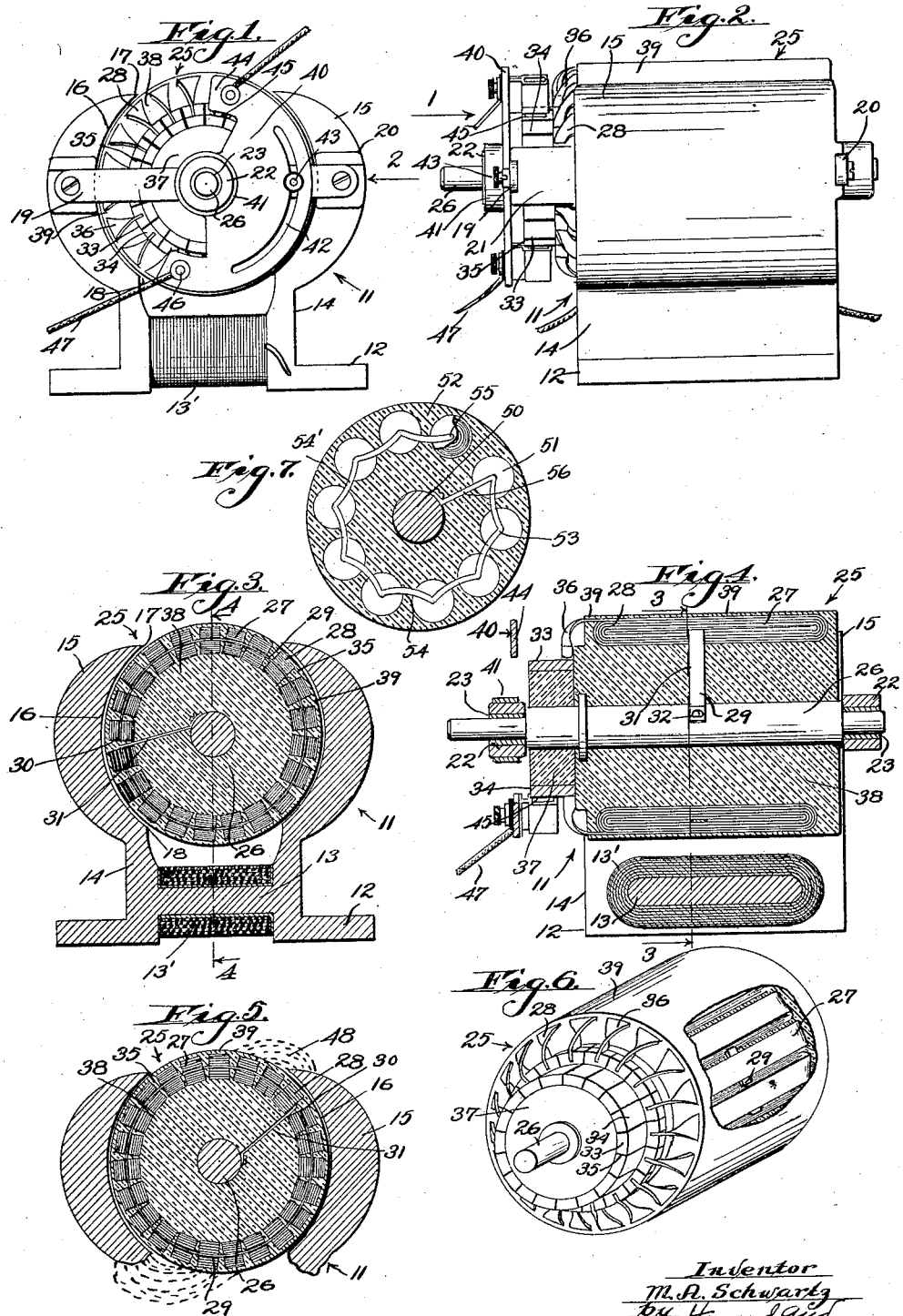

Patented Apr. 29, 1930

1,756,800

UNITED STATES PATENT OFFICE

MORRIS A. SCHWARTZ, OF LOS ANGELES, CALIFORNIA

DISTORTION MOTOR

Application filed February 23, 1928. Serial No. 256,314.

My invention is a distortion electric motor of the type in which the magnetic field is distorted, due to heating part of the metal structure of the rotor and thereby changing its magnetic permeability.

An object of my invention is the development of a slow speed electric motor in which windings on the rotor are periodically electrically heated to such an extent as to change their magnetic permeability. This produces the effect of distorting the magnetic lines of force passing between the poles of the motor and thereby affecting the rate of rotation of the motor in accordance with the degree of heating and also the reversal of the motor if desired.

The invention of the present case distinguishes from my prior patent for a magnetic distortion motor, No. 1,431,545 issued Octo20 ber 10, 1922, in employing an electrical arrangement for heating the metal parts of the rotor or armature, and also in other features apparent from the following description.

My present invention may be considered as an improvement on my patent application for a distortion motor, Serial No. 245,899, filed January 11, 1928.

An object of my invention is the construction of a rotary motor having preferably a pair or pairs of field poles and with a rotor journaled to rotate between such poles; the rotor is provided with a plurality of ribbon-like windings of metal, these windings extending longitudinally of the rotor. Such windings are connected in series by a strap-like device extending in a circumferential direction around the set of windings or spools. One end of this strap is connected to the shaft of the rotor and the other end terminates at one of the spools adjacent to the spool connected to the shaft.

Each of the spools is connected to a commutator segment and shiftable brushes are positioned to engage these commutator seg45 ments and pass an electric current through the windings of each of the spools as the rotor rotates, the current being conducted by the strap from the spools to the ground connection through the shaft. Therefore, as each spool becomes heated by the current passing therethrough, the magnetic field is distorted so that the magnetic lines of force do not have an equal magnetic effect on the rotor and hence cause the rotor to rotate at varying speeds, and by shifting the brushes the rotor may be reversed.

My invention is illustrated in the accompanying drawings, in which:

Figure 1 is an end view of the motor taken in the direction of the arrow 1 of Fig. 2.

Fig. 2 is a side elevation taken in the direction of the arrow 2 of Fig. 1.

Fig. 3 is a diametrical section through the motor taken substantially on the line 3—3 of Fig. 4.

Fig. 4 is a longitudinal section through the motor, as if taken on the line 4—4 of Fig. 3.

Fig. 5 is a section somewhat similar to Fig. 3 showing the distortion of the magnetic lines of force.

Fig. 6 is a perspective view of the rotor showing the connection of the ribbons to the commutator segments and part of the rotor being broken away to show the ribbon-like spools.

Fig. 7 is a cross-section of an alternative form of my invention showing the coils in end elevation.

The field construction designated generally by the numeral 11 comprises a base 12 having a core 13 connecting the base from side to side and having an energizing coil 13' thereon, there being a pair of vertical sections 14 extending upwardly from the base. At each end of the core above the sections 14 there are two pole pieces 15, such pole pieces having a circular face 16 concentric with the center of the rotor. There are substantially equal spaces 17 and 18 between the upper and lower edges of the pole pieces. Cross bars 19 and 20 are attached to the pole pieces, the bar 19 being attached to lugs 21 extending outwardly from such pole pieces. These have a hub 22 with a bushing 23 therein, thus forming the journals for the rotor.

The rotor designated generally by the numeral 25 is constructed with a shaft 26, the ends of the shaft being journaled in the bushings 23, and positioned around the shaft and concentric therewith there are a series of spools 27. Each of these spools is formed of a metal ribbon 28 wound into a flat coil or spool, and connecting the center of each of these spools there is a circumferential strap 29, the strap being electrically connected to the inside windings of each of the spools. The windings of each spool are insulated from adjacent windings by suitable insulation on the metal ribbon.

The strap 29 terminates at one of the spools, as indicated by the numeral 30 and at the next adjacent spool there is an inward extension 31 of the strap, which is connected to the shaft 26 as indicated at 32, this forming an electrical connection.

Mounted on the shaft 26 there is a commutator 33, this being divided into the usual segments 34 with insulating material 35 between each segment, and the ends 36 of each of the ribbon-like spools is connected to a segment of the commutator. In the illustration the ribbon is given a twist and secured to its commutator segment by a good electrical conducting connection.

The segments of the commutator are supported on the shaft by insulating material 37 and the body of the rotor inside of the circular spools is also filled with insulating material 38 and a layer of insulating material 39 is on the periphery of the rotor covering the spools.

A brush supporting plate 40 has a hub 41, the hub being mounted on the hub 22 of the strap 19 to have a limited oscillating movement. This plate 40 is provided with an arcuate slot 42 through which extends a pin 43 secured to the strap 19 and having a clamp nut thereon. The plate 40 has extending ends 44 with brushes 45 mounted thereon, these brushes being electrically connected to terminal posts 46 to which connect flexible lead wires 47. The brushes bear on the commutator in the ordinary manner.

The electric current for heating the spools of the armature follows the circuits through the lead wires 47, the terminals 46, the brushes 45 and from each commutator segment through an individual spool, and from the spool the current is conducted through the strap 29, the extension 31 thereof, to the shaft 26, and thence to a ground connection through the straps 19 or in any other suitable manner.

The electric current passing through each of the spools heats such spool to a temperature which destroys its magnetic permeability or greatly lessens this, therefore in operation of the motor it is desirable to maintain the spools at a constant temperature near the critical point, so that the electric current will heat each individual spool above this critical temperature; and that in the rotation of the rotor, these spools which have been heated will cool down below the critical temperature.

If all the spools have the same magnetic permeability, the lines of magnetic force pass in a uniform path between the pole pieces 15 of the field; but when certain spools are heated and lose their magnetic permeability, the magnetic lines of force are distorted, as indicated in the dotted lines 48 of Fig. 5. This action gives a rotary motion to the rotor and by shifting the plate 40 into different positions, the pull of the rotor may be varied, and if desired, the distortion may be shifted to such an extent as to reverse the direction of rotation of the rotor.

In the construction of Fig. 7 the shaft is designated by the numeral 50 and arranged around the shaft there are a plurality of spools 51 formed of wire windings. These spools are embedded in insulating material 52. The center winding of each of the spools terminates in the center of the spool, as indicated at 53 and these center connections have a conducting strap 54 interconnecting one spool and the other. The strap is indicated as terminating as indicated at 55 and the adjacent spool is connected by a strap lead 56 to the shaft 50. The outside windings of the spools are connected to a commutator in substantially the same manner as illustrated in Figs. 4 and 6.

The rotor of Fig. 7 functions substantially the same as the rotor of Figs. 1 through 6. A feature of my invention is that the brushes energize separate coils, these being on opposite sides of the rotor and the magnetic flux between the pole pieces passes across and through the various windings or spools. This magnetic flux follows substantially a direct path when the coils are all of the same temperature and before heating. However, as each coil becomes heated by the current passing therethrough, the magnetic flux is altered, thus causing and maintaining a rotation. The speed varies in accordance with the rate at which the temperature of the coils increases due to the current flowing therethrough, and this heating depends on the amperage of current supplied to the coils.

My present distortion motor distinguishes from that of my pending application above mentioned in that in the application the pair of pole pieces act substantially on one coil at a time as such coil is heated electrically, whereas in this application the pair of pole pieces act on two opposite coils simultaneously and successively as such coils are heated in the rotation of the rotor, these coils being at the top and bottom of the field pole construction.

A characteristic feature of my invention is that the series of coils are arranged concentric with the motor shaft and that the series of coils therefore form substantially a cylinder, the individual coils however, being spaced apart, and being unitary structures. These coils have a common return current connection and one or more coils may be heated at a time through the current making a connection through the commutator. Each coil is complete in itself on one side of the shaft.

Various changes may be made in the principles of my invention without departing from the spirit thereof, as set forth in the description, drawings and claims.

I claim:

1. A distortion motor having a plurality of energized field poles, a rotor having a shaft and a plurality of conducting coils arranged concentric to the shaft, the coils being insulated one from the other, a common conductor connecting each of the coils to the shaft, and means to energize each coil in succession whereby the coils may be successively heated to distort the magnetic lines of force.

2. A distortion motor comprising in combination a field construction having a base, a core and a plurality of pole pieces, the core having an energizing winding thereon, a rotor having a shaft, a pair of straps each having a hub connecting the pole pieces, the shaft being journaled in said hubs, a plurality of conducting coils formed of strap-like material, said coils being arranged concentric to the shaft, the coils being flattened having a greater dimension parallel to the shaft, insulating material separating the coils from the shaft, a commutator having a plurality of insulated segments insulated from the shaft, each segment being connected to a coil, a pair of brushes adjustably mounted to engage the commutator, and a return conductor connected to each of the coils and to the shaft.

3. A distortion motor, as claimed in claim 2, a quadrant mounted for limited rotational movement on one of the hubs and having the brushes connected thereto, said quadrant having an arcuate slot and a clamping device operating through said slot whereby the brushes may be positioned in different angular positions.

4. A distortion motor comprising in combination a field construction having an energized core and a pair of pole pieces, a rotor having a plurality of conducting coils rotating between said pole pieces, means to conduct a heating current simultaneously to a pair of conducting coils, and means forming a return connection from each of the conducting coils, the coils being heated distorting a pair of magnetic fields between the pole pieces.

5. A distortion motor comprising in combination a field construction having a base, a core and a pair of pole pieces, the core having an energizing winding, a rotor having a shaft, a plurality of conducting coils concentric therewith, a connection from a pair of conductors through the coils above and below the pole pieces, a return connection from each of the coils, the current through the conductors and the coils energizing a pair of coils in succession above and below the field pieces, whereby the magnetic field is distorted above and below the said pole pieces.

6. A distortion motor comprising in combination a rotor having a shaft and a plurality of individual conducting elements, each element being complete in itself and electrically insulated one from the other and each element being on one side of the said shaft, a common conductor connected to each of the elements, a plurality of field poles, means to convey current to two or more of the said conducting elements, whereby said elements may be heated to change the magnetic permeability thereoef.

7. A distortion motor having a rotor with a shaft, a plurality of conducting coils arranged concentric to the shaft, each coil being complete in itself on one side of the shaft, a common connection for a conducting current leading to each of the coils, means to successively energize one or more of the coils whereby such coil or coils are changed as to their magnetic permeability and a plurality of energized field poles.

8. A distortion motor comprising in combination a rotor having a shaft and a plurality of conducting coils, each coil consisting of windings arranged with their larger dimensions parallel to the shaft and each coil being complete on one side of the shaft, the coils being insulated one from the other, a common electrical connection from one end of each coil, a commutator having a connection to the opposite end of each coil, one or more brushes engaging the commutator and a plurality of energized field coils, the heating current being adapted to heat each of the coils and change its magnetic permeability.

9. A distortion motor comprising in combination a rotor having a shaft, a plurality of conducting coils, each coil being made of a ribbon-like strip, the coils being flattened and having the flat portion parallel to the shaft and each coil being complete on one side of the shaft, a common electrical connection from one end of each of the coils, means to energize two or more coils by an electrical connection to the opposite end of each of the coils, and a plurality of energized field poles, the energizing current being adapted to heat the coils and change the magnetic permeability.

10. A distortion motor comprising in combination a rotor having a shaft and a plurality of conducting coils, each coil being composed of a ribbon-like strip and each coil being flattened with the flat portion parallel to the shaft, a common electrical connection from one end of each of the coils, a commutator, an electrical connection from the sections of the commutator to each coil, one or more brushes to engage the commutator and a plurality of energized field coils, the conducting coils being adapted to be heated by a current passing therethrough and have their magnetic permeability changed by the heat developed by such current.

In testimony whereof I have signed my name to this specification.

M. A. SCHWARTZ..